(12) United States Patent
Buchstaller

(10) Patent No.: US 10,904,340 B2
(45) Date of Patent: Jan. 26, 2021

(54) METHOD FOR OPERATING AN AUTOMATION NETWORK

(71) Applicant: Siemens Aktiengesellschaft, Munich (DE)

(72) Inventor: Dominic Buchstaller, Friedrichshafen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/609,496

(22) PCT Filed: May 2, 2017

(86) PCT No.: PCT/EP2017/060365
§ 371 (c)(1),
(2) Date: Oct. 30, 2019

(87) PCT Pub. No.: WO2018/202276
PCT Pub. Date: Nov. 8, 2018

(65) Prior Publication Data
US 2020/0145494 A1 May 7, 2020

(51) Int. Cl.
*H04L 29/08* (2006.01)
*H04L 12/66* (2006.01)

(52) U.S. Cl.
CPC .............. *H04L 67/12* (2013.01); *H04L 12/66* (2013.01); *H04L 67/26* (2013.01)

(58) Field of Classification Search
CPC ......... H04L 67/12; H04L 12/66; H04L 67/26; H04L 67/10; H04L 67/28;
(Continued)

(56) References Cited

U.S. PATENT DOCUMENTS 10,397,303 B1* 8/2019 Kuo .................... H04L 61/2038
2018/0096417 A1* 4/2018 Cook .................... H04L 67/306
(Continued)

OTHER PUBLICATIONS

Search Report for International Application No. PCT/EP2017/060365, 16 pages, dated Jul. 5, 2017.
(Continued)

*Primary Examiner* — Will W Lin
(74) *Attorney, Agent, or Firm* — Slayden Grubert Beard PLLC

(57) ABSTRACT

Various embodiments include a method for operating an automation network comprising a gateway device and a plurality of network devices. The methods include: subscribing a network device to subscription data with a respectively associated subscription identifier; publishing data on the gateway device under a identifier; publishing publication data as subscribed subscription data under a subscription identifier corresponding to the publication identifier so each of the plurality of network devices subscribed with the same subscription identifier as the respective identifier receive the data transmitted with the subscription identifier. The respective network devices each comprise: a field device subscribing to, collecting, and/or publishing measurement or control data, and a database subscribing to, storing, providing or publishing the data of the field device, device data about network devices present in the automation network, and data about users of the network devices. The transmission of data takes place according to a single specified protocol.

13 Claims, 3 Drawing Sheets

(58) Field of Classification Search
CPC ......... H04L 2012/4026; H04L 12/4625; H04L 12/40169
See application file for complete search history.

(56) References Cited

U.S. PATENT DOCUMENTS

| | | | |
|---|---|---|---|
| 2018/0213378 A1* | 7/2018 | Brown | H04L 67/12 |
| 2018/0219736 A1* | 8/2018 | Bugenhagen | H04L 43/04 |
| 2018/0248973 A1* | 8/2018 | Cook | H04L 63/102 |
| 2018/0316641 A1* | 11/2018 | Mankovskii | H04L 67/02 |

OTHER PUBLICATIONS

Stanford-Clark Andy et al: "MQTT for Sensor Networks (MQTT-SN) Protocol Specification Version 1.2 Contents", XP055358775, Gefunden im Internet: URL:http://mqtt.org/new/wp-content/uploads/2009/06/MQTT-SN spec v1.2.pdf [gefunden am Jun. 23, 2017] das gauze Dokument, Nov. 14, 2013.

Püringer Armin et al: "How "Industrial Cloud Communications" Delivers the Benefits of Internet-Connected Manufacturing", XP055384410, Gefunden im Internet: RL:https://www.hilscher.com/fileadmin/user upload/PDF/Hilscher Industrial Cloud Corniiiunications WP 1 2016 FINAL.PDF; pp. 5-10, 2016.

Hilscher: "Edqe Gateway NIOT-E-TIJCX-GB-RE", XP055384415, Gefunden im Internet: URL:https://www.hilscher.com/fileadmin/cms upload/de/Resources/pdf/Edge Gateway NIOT-E-TIJCX-GB-RE UM 01 EN.pdf 9.6 MQTT input node; 9.7 MQTT output node; pp. 68-pp. 72; 10.2 Example 2: MQTT input node; 10.3 Example 3: MQTT output node; pp. 83-86, 2016.

* cited by examiner

METHOD FOR OPERATING AN AUTOMATION NETWORK

CROSS-REFERENCE TO RELATED APPLICATIONS

This application is a U.S. National Stage Application of International Application No. PCT/EP2017/060365 filed May 2, 2017, the contents of which are hereby incorporated by reference in their entirety.

TECHNICAL FIELD

The present disclosure relates to networks. Various embodiments include methods for operating an automation network, automation networks, and/or computer program products.

BACKGROUND

An automation network comprises field devices, such as control systems, converter and measuring devices, and a central control device, with which the field devices conventionally communicate using a communication bus, such as Profinet, Profibus or Modbus. Cloud-based database devices are known, as central control devices in widely distributed automation networks. The field devices in a distributed automation network communicate with the database device via a respective protocol.

In addition, in a distributed automation network to coordinate the operation of the automation network, device data relating to the field devices in the network and user data relating to users of the devices in the network are required. The exchange of device and user data uses additional protocols such as SQL or TCP sockets, which are optimized for management tasks. The use of different protocols on a wide range of different devices leads to a high level of system complexity.

SUMMARY

Against this background, the teachings of the present disclosure may be implemented to improve the operation of an automation network. For example, some embodiments of the teachings herein include a method for operating an automation network (1), comprising a gateway device (2) and a plurality of network devices (3, 4, 5), wherein the network devices (3, 4, 5) subscribe to subscription data ($AD_2$) by means of a respectively associated subscription identifier ($AK_2$) and publish publication data ($PD_1$) on the gateway device (2) under a respectively associated publication identifier ($PK_1$); wherein the gateway device (2) publishes publication data ($PK_1$) as subscribed subscription data ($AD_1$) under a respective subscription identifier ($AK_1$), which corresponds to the respective publication identifier ($PK_1$) of the publication data ($PD_1$), in such a way that to all network devices (3, 4, 5) which subscribe to subscription data ($AD_1$) with the same subscription identifier ($AK_1$) as the respective publication identifier ($PK_1$), the subscribed subscription data ($AD_1$) are transmitted with the subscription identifier ($AK_1$); wherein the network devices (3, 4, 5) comprise: a field device unit (4) which subscribes to, collects and/or publishes measurement data (MD) and/or control data (SD), and a database device (3) which subscribes to, stores, provides and/or publishes the measurement data (MD) and/or control data (SD) of the field device unit (4), device data (GD) about network devices (3, 4, 5) present in the automation network (1), and user data (BD) about users of the network devices (3, 4, 5); and wherein the transmission of data (MD, SD, BD, GD) between the network devices (3, 4, 5) takes place according to a single specified protocol, in particular exclusively by subscribing and publishing via the gateway device (2).

In some embodiments, the specified protocol is the message-queue telemetry transport protocol/MQTT protocol, a respective subscription identifier and a relevant publication identifier are each an MQTT topic, and the gateway device (2) implements an MQTT broker.

In some embodiments, transmission during a respective subscription and/or publishing operation takes place via a particular TCP connection path and the specified protocol is the MQTT protocol and/or the transmission during a respective subscription and/or publishing operation takes place via a respective UDP, ZigBee or TinyOS connection path and the specified protocol is the MQTT-SN protocol.

In some embodiments, data transfers between the network devices (3, 4, 5) and/or requests to the gateway device (2) which do not comply with the specified protocol are disabled and/or blocked.

In some embodiments, the field device unit (4) collects measurement data (MD) and publishes said data as publication data ($PD_1$) with a measurement data identifier (MK) as a publication identifier, as subscription data ($AD_1$) the database device (3) subscribes to the measurement data (MD) with the measurement data identifier (MK) as a subscription identifier, the database device (3), in accordance with the subscribed measurement data (MD) and/or the device data (GD) stored in the database device (3), generates control data (SD) for the field device unit (4) and publishes said control data as publication data ($PD_2$) with the control data identifier (SK) as publication identifier, as subscription data ($AD_2$) the field device unit (4) subscribes to the control data (SD) with the control data identifier (SK) as a subscription identifier and the field device unit (4) performs an automation task in accordance with the subscribed control data (SD).

In some embodiments, the network devices (3, 4, 5) also comprise an operating device (5), which displays subscribed data (GD, SD, MD, BD) and/or collects and publishes management instructions (VD), wherein management instructions (VD) are instructions of an operator, which cause the database device (3) to modify the data (MD, SD, GD, BD) stored in the database device (3).

In some embodiments, the operating device (5) is a tablet computer, a smartphone, a portable computer or a static computer.

In some embodiments, the field device unit (4) collects measurement data (MD) and publishes said data as publication data with a measurement data identifier (MK) as a publication identifier, the operating device (5) subscribes to the measurement data (MD) with the measurement data identifier (MK) as a subscription identifier as subscription data ($AD_1$, $AD_6$), and the operating device (5) displays the subscribed data (MD).

In some embodiments, the database device publishes the device data (GD) with a device data identifier (GK) as a publication identifier and/or publishes the user data (BD) with a user data identifier (BD) as a publication identifier, and the operating device (5) subscribes to the device data (GD) with the device data identifier (GK) as a subscription identifier as subscription data ($AD_3$) and/or subscribes to the user data (BD) with the user data identifier (BD) as a subscription identifier as subscription data ($AD_4$), and the operating device (5) displays the subscribed device data (GD) and/or the subscribed user data (BD).

In some embodiments, data (MD, SD, GD, BD, VD) intended for publishing by a specific network device (3, 4, 5) are encoded in publication data ($PD_{1...4}$) in a data format of the specified protocol and subscribed subscription data ($AD_{1...4}$) in the data format of the specified protocol are received by a respective subscribing network device (3, 4, 5).

In some embodiments, the encoding of the data intended for publishing into a data format of the specified protocol comprises splitting the data intended for publishing over a plurality of MQTT frames.

As another example, some embodiments include an automation network (1), which comprises a gateway device (2) and a plurality of network devices (3, 4), wherein the network devices (3, 4, 5) are configured for subscribing to subscription data ($AD_2$) with a respective associated subscription identifier ($AK_2$) and for publishing publication data ($PD_1$) on the gateway device (2) under a respective associated publication identifier ($PK_1$); wherein the gateway device (2) is configured for publishing the publication data ($PK_1$) as subscribed subscription data ($AD_1$) under a respective subscription identifier ($AK_1$), which corresponds to the respective publication identifier ($PK_1$) of the publication data ($PD_1$), in such a way that to all network devices (3, 4, 5), which subscribe to subscription data ($AD_1$) with the same subscription identifier ($AK_1$) as the respective publication identifier ($PK_1$), the subscribed subscription data ($AD_1$) are transmitted with the subscription identifier ($AK_1$); wherein the network devices (3, 4, 5) comprise: a field device unit (4) which is configured to subscribe to, collect and/or publish measurement data (MD) and/or control data (SD), and a database device (3) which is configured for subscribing to, storage, provision and/or publication of the measurement data (MD) and/or of control data (SD) of the field device unit (4), of device data (GD) about network devices (3, 4, 5) present in the automation network (1), and of user data (BD) about users of the network devices (3, 4, 5); and wherein the respective network devices (3, 4, 5) are each configured for transferring data (MD, SD, BD, GD) to and from other network devices (3, 4, 5) according to a single specified protocol, in particular exclusively by subscribing and publishing via the gateway device (2).

In some embodiments, the automation network is configured for carrying out a method as described above.

As another example, some embodiments include a computer program product, which causes the execution of a method as described above on at least one program-controlled device.

BRIEF DESCRIPTION OF THE DRAWINGS

Further embodiments and aspects of the teachings herein are the subject matter of the dependent claims, as well as the exemplary embodiments described in the following. In the following the teachings are explained in more detail based on example embodiments and with reference to the attached drawings.

In the figures the same or functionally equivalent elements have been provided with the same reference numerals, unless otherwise indicated.

DETAILED DESCRIPTION

Figure 1:
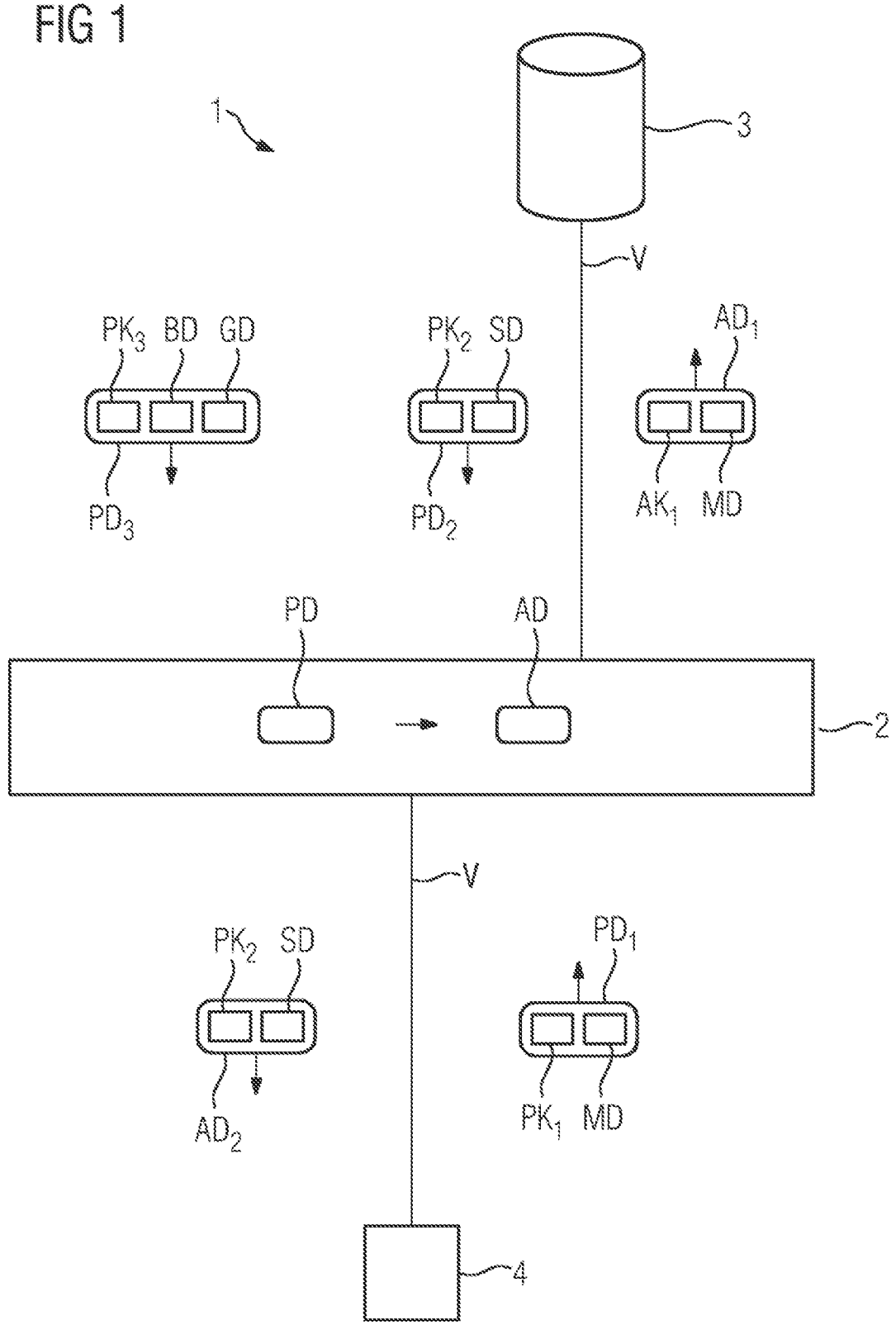
FIG. 1 shows a schematic view of an automation network incorporating teachings of the present disclosure and its operation in accordance with a first exemplary embodiment.

In some embodiments, there is a method for operating an automation network which comprises a gateway device and a plurality of network devices. In some embodiments, the network devices subscribe to subscription data with a respective associated subscription identifier and publish publication data under a respective associated publication identifier on the gateway device. The gateway device publishes the publication data as subscribed subscription data under a respective subscription identifier, which corresponds to the respective publication identifier of the publication data, in such a way that to all network devices which subscribe to subscription data with the same subscription identifier as the respective publication identifier, the subscribed subscription data are transmitted with the subscription identifier. The network devices comprise a field device unit which subscribes to, collects and/or publishes measurement and/or control data, and a database device which subscribes to, stores, provides and/or publishes the measurement and/or control data of the field device unit, device data about network devices present in the automation network, and user data about users of the network devices. The data, in particular, the measurement and/or control data, the device data and the user data, are transmitted between the network devices according to a single specified protocol. In embodiments the transmission of the measurement and/or control data, the device data and the user data takes place exclusively by subscribing and publishing via the gateway device.

In some embodiments, the automation network thus comprises a database device, a gateway device, field device units and can comprise other network devices required for the operation of the automation network, such as a control device and an operating device. The database device can comprise a measurement database, a user database and/or a device database in a cloud. Furthermore, the database device can comprise a central control unit to control the operation of the automation network.

In some embodiments, a field device unit comprises, in particular, a networked device for performing measurement and/or automation tasks, in particular an IoT-node, an embedded device or a sensor and/or actuator device, which can be communicatively coupled to a connection path such as a network, a bus, etc. either by wireless or wired means. In particular, the field device unit can comprise at least one sensor for measuring or collecting measurement data and a communication unit for transferring measurement data as publication data to the gateway device. Furthermore, the field device unit can have at least one actuator for performing an automation task.

In some embodiments, all network devices of the automation network may transmit data exclusively using the specified protocol, which provides the subscription and publishing of data via the gateway device. In particular, each network device can publish publication data under a respective publication identifier, without knowing the subscribing network devices or the number or network addresses of the subscribing network devices.

The term subscribing is intended to mean that by submitting a subscription request which comprises a subscription identifier, a network device indicates to the gateway device that it would like to receive subscription data with which the subscription identifier is associated. As long as the network device subscribes to the subscription data with the subscription identifier, it obtains subscription data with the subscription identifier whenever corresponding subscription data are available on the gateway device. The subscription can be terminated by sending a cancellation request.

The term publishing is to mean that a network device transmits data to the gateway device as publication data with a publication identifier. The network device does not, for example, have any knowledge of the network devices as actual recipients of the publication data in the automation network, the network addresses or the number of the actual recipients. The gateway device identifies network devices which have previously submitted a subscription request for a subscription identifier to the gateway device which corresponds to the publication identifier and transmits the publication data to all identified network devices as subscription data with the subscription identifier.

In some embodiments, the publication data and the subscription data each comprise an identifier and a user data field. The user data field, also referred to as the payload, can comprise the measurement and/or control data, device data, user data, and/or management instructions. An identifier is the respective publication or subscription identifier, such as a measurement data identifier, control data identifier, device data identifier, user data identifier and/or management identifier.

In that respect the publication of relevant data as publication data under a particular publication identifier on the gateway device can be understood as meaning that publication data are produced which comprise the respective data as payload and also comprise the relevant publication identifier, and the publication data are transmitted to the gateway device.

The subscription of relevant data as subscription data under a particular subscription identifier on the gateway device should be understood to mean, in particular, that after a corresponding subscription request has been submitted to the gateway device, subscription data are received which comprise the respective data as the payload and also comprise the respective subscription identifier.

The device data which are stored in the database device, can store, in particular, the network devices that are present in the network and which network device subscribes to and/or publishes data with which identifier. In addition, other device data are possible, such as configuration data or characteristics for a specific field device unit, and/or for a sensor or actuator of the respective field devices.

Configuration data can be any data which affect the operation of the field device unit, for example, turn-on and turn-off times or information on the frequency of collection and transmission of measurement data. For example, a characteristic can be a data series, in which the possible input variables or measurement variables, such as a piezoelectric voltage, of a sensor are assigned to corresponding output variables such as a pressure or a deflection.

In the user data which are stored in the database device, in particular login credentials, such as user names and passwords and authorization data can be stored that specify which users are allowed to access which sections of the automation network, for example a specific selection of network devices and/or a certain selection of data stored in the database device.

By subscribing and publishing with the single specified protocol, data can be efficiently transmitted with low bandwidth, low resource requirements and little configuration effort, also over limited reliability, widely distributed networks between a large number of network devices.

In some embodiments, the device data and the user data and management instructions are transmitted exclusively by subscribing and publishing via the gateway device in accordance with the same single specified protocol as the measurement and control data. Field device units may only support the specified protocol. This makes it possible to implement appropriate field device units in a resource-efficient way, because only one communication protocol is necessary. Thus, the field device units are enabled to access user data and device data of the automation network via the specified protocol.

This eliminates the need to support other complex protocols on the network devices, such as the database device and the gateway device of the automation network. These devices can manage a very large number of field device units, thus enabling an economical use of resources, such as bandwidth and processor time. In addition, the management effort for the management, maintenance, fault-finding and correction is reduced if in the entire automation network only the one specified protocol is used. In addition, the data modeling may be simplified if all data in the automation network are transported with the same specified protocol.

In some embodiments, the specified protocol is the message-queue telemetry transport (MQTT) protocol. In this case each subscription identifier and each publication identifier is a particular MQTT topic, and the gateway device implements an MQTT broker. MQTT is an example of a given protocol that allows the publishing and subscription of data, such as measurement data in a reliable and resource- and data-optimized way and is conventionally only optimized for the exchange of field data, measurement data and telemetry data.

In some embodiments, transmission during a respective subscription and/or publishing operation takes place via a respective TCP connection path and the specified protocol is the MQTT protocol. A transmission for a respective subscription and/or publishing operation can also take place via a respective UDP, ZigBee or TinyOS connection path, wherein the specified protocol is the MQTT-SN protocol. MQTT-SN is a refinement to the MQTT, which enables connection paths which are not based on TCP/IP. The method may be implemented in widely distributed, heterogeneous networks with different types of connection paths.

In some embodiments, data transfers between the network devices of the automation network and/or requests to the gateway device which do not conform to the specified protocol, are disabled and/or blocked. In particular, a request is understood to mean sending a message to the gateway device. The disabling can be carried out by excluding relevant program product components on the corresponding network devices and/or the gateway device, and the blocking includes closing relevant ports and/or by installing a firewall. The robustness and the security of the automation network can thus be increased.

In some embodiments, one or more field device units collect measurement data and publish the measurement data as publication data with one or more measurement data identifiers as a publication identifier. As subscription data the database device subscribes to the measurement data with the one or more measurement data identifiers as the subscription identifier. The database device generates control data for the one or more field device units and/or for one or more additional field device units in accordance with the subscribed measurement data and/or with the device data stored in the database device, and publishes the generated control data as publication data with a control data identifier as the publication identifier. The one or more field device units and/or the one or more additional field device units subscribe as subscription data to the control data with the control data identifier as the subscription identifier and perform an automation task in accordance with the subscribed control data.

Measurement data are data which are collected, for example, with a sensor or other measuring device of the field device unit, such as a temperature, a pressure, a wind strength, a sound level, a radiation intensity, a voltage, current intensity, a phase position, etc., as well as more extensive measurement data such as an image, an image sequence or an audio sample. In particular, the measurement data exist in digital form. The control data include, for example, a setpoint, a control command and/or a control parameter for an actuator of a particular field device. An automation task is, for example, the actuation of an actuator, an actuating element or motor.

In the in particular cloud-based database device, by using the specified protocol measurement data from widely distributed field devices are combined, evaluated and used to determine control data for the same or for other field devices. In doing so, information stored in the device data can also be taken into account. The use of the specified protocol may provide a lean and efficient operation of the automation network.

In some embodiments, the network devices also comprise a control device, which displays subscribed data and/or collects and publishes management instructions. The subscribed data can be any data items that are published in the automation network, in particular measurement data, device data or user data.

The management instructions are instructions of an operator, which cause the database device to modify data stored in the database device. A management instruction comprises, in particular, management data, such as an instruction to add information about a user to the user data, an instruction to delete data about a user from the user data, to change data about a user such as changing a password, in the user data, to add a network device such as a field device unit to the device data, to delete a network device from the device data or to change configuration parameters of a network device in the device data, and/or an authorization request. The management instructions are captured, for example, by typing, touching a display, activating control elements, voice input or other operator interaction by the operator.

The operating device, as one of the network devices in accordance with the proposed methods, also communicates in accordance with the specified protocol with the database device and, where appropriate, with other network devices of the automation network. This eliminates the need to implement on the gateway device, the database device and the other network devices a separate protocol for interacting with an operator and the transmission of management instructions for the operator. This reduces the system complexity. In addition, the control device, which can comprise a mobile device with limited resources, such as limited computing power, limited power reserves and limited storage space, can benefit from the specified resource-conserving protocol, such as MQTT.

In some embodiments, the operating device is a tablet or tablet computer, a smartphone, a portable computer or a static computer. The control device can execute a program, an app and/or a web browser to implement the functionality of the operating device.

In some embodiments, the field device unit collects measurement data and publishes this as publication data with a measurement data identifier as a publication identifier, the operating device subscribes to measurement data as subscription data with the measurement data identifier as the subscription identifier, and the operating device displays the subscribed measurement data. In some embodiments, the database device publishes device data with a device data identifier as the publication identifier and/or user data with a user data identifier as a publication identifier, the operating device subscribes to the device data as subscription data with the device data identifier as a subscription identifier and/or the user data with the user data identifier as a subscription identifier, and the operating device displays the subscribed device data and/or the subscribed user data.

Thus, the operating device, by directly communicating with the field device units using the specified protocol, can display measurement data, which are published by the field device units, "live". It can also display a system configuration in the same way as device data and user data stored in the database device, which the database device publishes in accordance with the specified protocol, without the operating device needing to support an additional protocol.

In some embodiments, the operating device captures the management instructions of an operator, which cause the database device to modify the data stored in the database device. The operating device publishes the management instructions with a management identifier as a publication identifier. The database device subscribes to the management instructions with the management identifier as a subscription identifier and adapts the device data stored in the database device and/or user data on the basis of the subscribed management instructions.

The operating device therefore provides an operator with the ability to modify the device data and user data stored in the database device. An operator can thus operate the automation network with the operating device, wherein all data and instructions are transmitted according to the specified protocol by publishing and subscribing. The network devices and the gateway device do not need to have separate protocols to implement the connection of the control device, and the system complexity is reduced accordingly. The modification of the device data and/or user data can involve addition (also referred to as entry or registration), deletion or editing of data about a device or network device, or about a user in the device data or the user data.

In some embodiments, data intended for publication by a respective network device in publication data are encoded into a data format of the specified protocol. Subscribed subscription data are received in the data format of the specified protocol by a respective subscribing network device and decoded. A data format is a specification of the structure of the data that can be published with the specified protocol. A conceivable format, for example, is a JSON or XML data format with a specified maximum length.

If MQTT is selected as the specified protocol, thus the MQTT protocol, since it is designed for simple payloads consisting of single measurement data such as sensor readings, only few resources, such as processor capacity and bandwidth. For example, in order then to also publish and subscribe binary image data from a camera or an imaging device, which comprise a plurality of individual pixel data, and management instructions, device data and user data using the specified protocol, this data will first be encoded if necessary into a simple format compatible with the protocol. The encoding can comprise, for example, a Base64 encoding of binary data or a data compression. In addition, the encoding can comprise an encryption in order to increase the data security.

In some embodiments, the encoding of the data intended for publishing into a data format of the specified protocol comprises splitting the data intended for publishing over a plurality of frames, such as a plurality of MQTT frames. A frame is a user data section or a payload of publication data or subscription data, which in the case of a publishing and subscribing operation in accordance with the protocol such as MQTT, can contain the data to be published or subscribed.

If MQTT is used as the specified protocol, a restriction can exist in relation to the maximum length of a payload that can be transported in a single MQTT transmission. The maximum length of a payload in some MQTT implementations is 4096 bytes, for example. The data exchanged in the automation network can exceed this length. For example, it would be conceivable that image or video data from a field device unit are recorded with a camera as measurement data and published and subscribed to in accordance with MQTT. Such data can be divided during the encoding into a plurality of MQTT frames or payloads, which are published and transmitted sequentially in separate MQTT transmissions. The individual payloads can additionally be equipped with a sequence number, which during decoding on the receiver side, enables the split data to be assembled from the payloads of the subscribed subscription data in the original order.

In some embodiments, an automation network comprises a gateway device and a plurality of network devices. The network devices are each configured for subscribing to subscription data with a respective associated subscription identifier and for publishing publication data under a respective associated publication identifier on the gateway device. The gateway device is configured for publishing the publication data as subscribed subscription data under a respective subscription identifier, which corresponds to the respective publication identifier of the publication data, in such a way that to all network devices which subscribe to subscription data with the same subscription identifier as the respective publication identifier, the subscribed subscription data are transmitted with the subscription identifier. The network devices comprise: a field device unit which is configured to subscribe to, collect and/or publish measurement data and/or control data, and a database device which is configured for subscribing to, storing, providing and/or publishing the measurement data and/or control data of the field device unit, device data about network devices present in the automation network, and of user data about users of the network devices. The respective network devices are each configured for transmitting data to and from other network devices according to a single specified protocol. In particular, the data are transmitted only by subscribing and publishing via the gateway device.

In some embodiments, the proposed automation network is configured to carry out the methods described herein. The embodiments and features described for the proposed method also apply correspondingly to the proposed automation network. The database device, the gateway device and a respective network device can each be designed as program-controlled devices. Each respective program-controlled device may comprise one or more units, wherein each unit, for example a computing unit or control unit, can be implemented in hardware and/or software technology. In the case of a hardware-based implementation, the respective unit can be implemented as a device or as part of a device, for example as a computer, a microprocessor, an embedded control device or as an IoT node. In the case of a software-based implementation, the respective unit can be implemented as a computer program product, as a function, as a routine, as part of a program code or as an executable object.

In some embodiments, a computer program causes the implementation of the method as described above on a respective unit. A computer program product, such as a computer program means, can be provided or supplied as a storage medium, such as a memory card, USB stick, CD-ROM, DVD, or else in the form of a downloadable file from a server to a network. This may include, for example, in a wireless communication network by the transmission of a corresponding file with the computer program product part or the computer program means.

Some embodiments also comprise combinations of features of the embodiments either described previously or in the following which are not explicitly mentioned. A person skilled in the art will also be able to add individual aspects as improvements or additions to each embodiment described.

In a first exemplary embodiment, which is shown in FIG. 1, an automation network 1 comprises a gateway device 2, a database device 3 and a network device 4. The network device 4 is a field device unit. The field device unit 4, the gateway device 2 and the database device 3 are communicatively connected to each other via a connection path V indicated by a solid line. In the following text, the operation of the automation network 1 is described. In this respect, a corresponding operating procedure is implemented by the illustrated gateway device 2 and the illustrated network devices 3, 4, which implement the corresponding method steps.

The field device unit 4 records measurement data MD and publishes this on the gateway device 2 under a first publication identifier $PK_1$, which contains, for example, "/fieldData", as the first publication data $PD_1$. To do so the field device unit 4 sends a MQTT "PUBLISH" message (an example of the publication data $PD_1$) with the publication identifier "/fieldData" and the measurement data MD as the payload to the gateway device 2.

The database device 3 subscribes to subscription data $AD_1$ with the subscription identifier $AK_1$, which also contains "/fieldData". This means that the database device 3 has previously transmitted a subscription request for subscription data $AD_1$ with the subscription identifier $AK_1$ "/fieldData" as the subscription request to the gateway device 2. The subscription request in this example is an MQTT "SUBSCRIBE" message in which the MQTT topic "/fieldData" is specified. Therefore, the database device 3 is known to the gateway device 2 as a subscriber of subscription data $AD_1$ with the identifier $AK_1$ "/fieldData". Therefore, the gateway device 2 transmits the measurement data MD from the publication data $PD_1$ published by the field device unit 4 with the publication identifier $PK_1$ "/field data" as subscription data $AD_1$ with the subscription identifier $AK_1$ "/fieldData" to the database device 3. To do so, the gateway device 2 sends an MQTT "PUBLISH" message (an example of the subscription data $AD_1$) with the publication identifier "/fieldData" and the measurement data MD as the payload to the database device 3. In this way, the database device 3 receives the measurement data MD, without the network device 4 necessarily being aware of the existence of a network address, etc. of the database device 3.

The gateway device 2 thus converts the published publication data PD that it receives into subscription data AD to be transmitted to subscribing network devices 3, 4, which in FIG. 1 is indicated schematically in the inside of the box representing the gateway device 2.

In addition, the database device 3 publishes control data SD under the publication identifier $PK_2$ "/controlData", such as a setpoint for the field device unit 4. The field device unit 4 has previously transmitted a subscription request $AD_2$ with the subscription identifier $AK_2$ "/controlData" as a subscription request to the gateway device 2. Therefore, the field device unit 4 is known to the gateway device 2 as a subscriber of subscription data $AD_2$ with the subscription identifier $AK_2$ "/controlData". Therefore, the gateway device 2 transmits the control data SD from the publication data $PD_2$ published by the database device 3 with the publication identifier $PK_2$ "/controlData" as subscription data $AD_2$ with the subscription identifier $AK_2$ "/controlData" to the field device unit 4. The publishing and subscription is carried out using MQTT messages in the same way as described above.

Also, under the publication identifier $PK_3$ "/managementData", the database device 3 publishes device data GD and user data BD as publication data $PD_3$. For the field device unit 4 in the present exemplary embodiment these have no meaning, therefore the field device unit 4 does not subscribe to subscription data with the subscription identifier "/managementData". Further network devices, not shown in FIG. 1, can subscribe to these data, however, and for this purpose use the same specified MQTT protocol and the same gateway device 2, via which the measurement data MD and the control data SD are also subscribed to and published.

Figure 2:
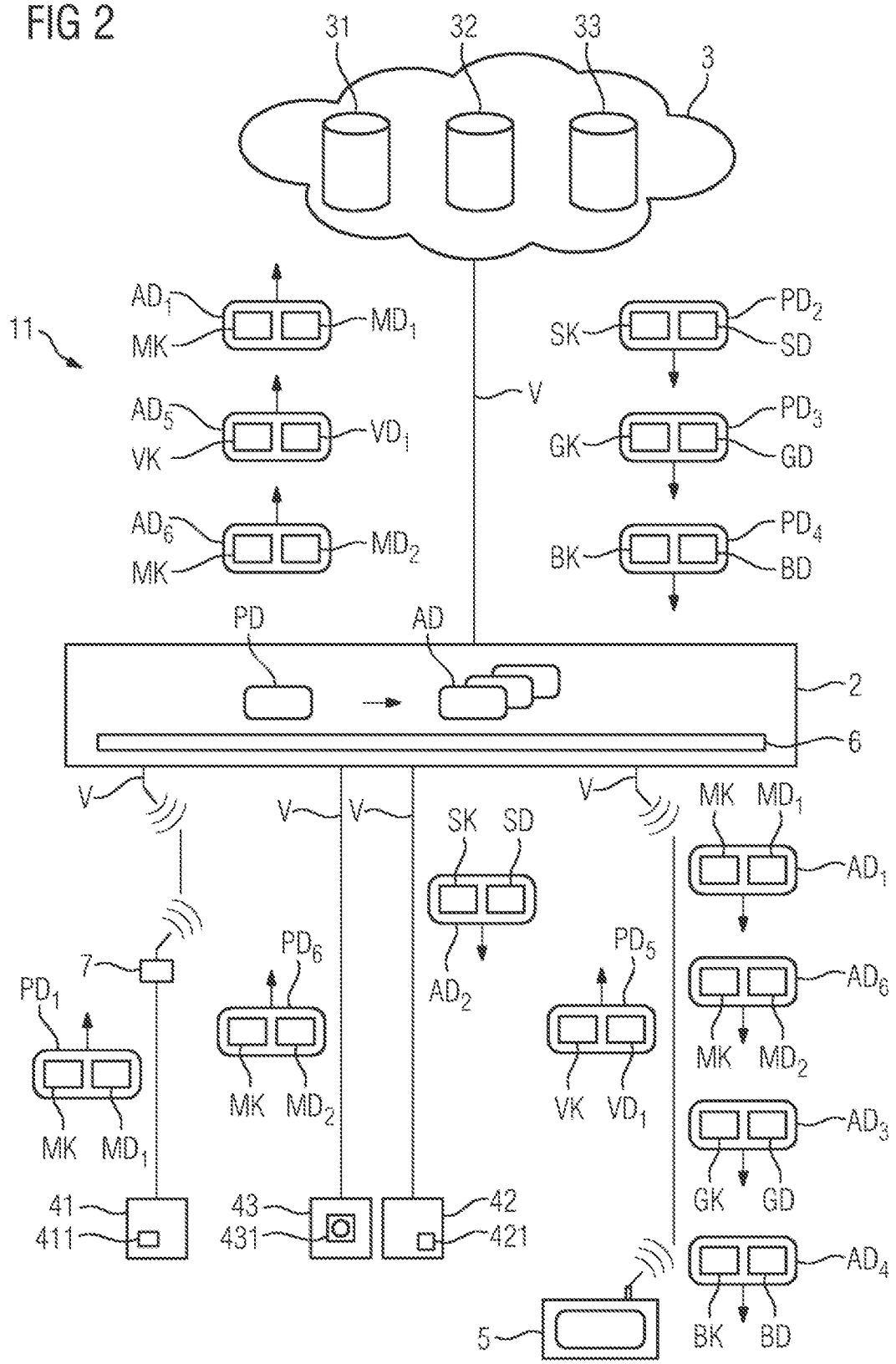
FIG. 2 shows a schematic view of an automation network incorporating teachings of the present disclosure and its operation in accordance with a second exemplary embodiment.

This will now be described in more detail on the basis of the second exemplary embodiment, which is shown in FIG. 2. In FIG. 2 an automation network 11 has a plurality of field device units 41, 42, 43, a database device 3 and an operating device 5. The first field device unit 41 is a field device with a sensor 411, the second field device unit 42 is a field device with an actuator 421, and the third field device unit 43 is a field device with an image sensor 431. The database device 3 is implemented as a cloud, and includes a measurement value database 31, a device database 32 and a user database 33. The operating device is a tablet computer 5.

The gateway device 2 comprises a firewall 6, which blocks requests and/or data transfers that do not conform to the MQTT Protocol. Therefore, a data transfer between the field devices 41, 42, 43, of the database device 3 and the control device 5 is only possible in accordance with the specified MQTT protocol via the gateway device 2.

The cloud-based database device 3, the field device units 41, 42 and 43 and the tablet computer 5 are connected via connecting paths V to the gateway device 2. The connecting path V between the gateway 2 and the tablet computer 5 is a wireless WLAN connection path. The connecting path V between the gateway device 2 and the field device 42 is a wireless ZigBee connection path. The connection path V between the gateway device 2 and the third field device unit 43, and the connection path between the cloud-based database device 3 and the gateway device 2 are each wired Ethernet connection paths. The connection path V between the gateway device and the field device 41 comprises a wired ProfiBUS section between the field device unit 41 and a bus coupler 7, and a wireless WLAN connection path between the bus coupler 7 and the gateway device 2.

In some embodiments, the network devices 3, 41, 42, 43, 5 transmit data exclusively in accordance with the specified MQTT protocol by publishing publication data $PD_1$ to $PD_6$ and subscribing to subscription data $AD_1$ to $AD_6$. The gateway device 2 transmits received publication data PD as subscription data AD to all respective subscribing network devices 3, 41, 42, 43, 5. The processes used in subscribing to, publishing and transmitting take place as in the first exemplary embodiment in accordance with FIG. 1 by means of MQTT messages. For a given subscription identifier $AD_{1...6}$ more than one subscription can exist, and this is why the gateway device 2 when converting the publication data PD into the subscription data AD may duplicate them and send them to a plurality of subscribing network devices 3, 4, 5. This is shown symbolically in FIG. 2 in the box representing the gateway device 2.

Processes occurring in the operation of the automation network 11 from FIG. 2 will now be described. The sensor 411 of the field device unit 41 collects measurement data $MD_1$, such as a temperature and a time stamp. The field device unit publishes the measurement data MD as a payload, which in JSON notation, for example, reads as "{"time": 20170103182205;"temperature": 18.2}", under a measurement data identifier MK as a publication identifier, such as "/fieldDevice41/fieldData" as the publication data $PD_1$.

In the device database 32 device data are stored, which comprise a list of all network devices 3, 4, 5 of the automation network 11 and the publication identifiers PK, with which these particular publication data PD publish. The database device 3 reads the device data from the device database 32 and subscribes to subscription data $AD_1$, $AD_5$, $AD_6$ with subscription identifiers MK, which correspond to respective publication identifiers of the field devices stored in the device database 32. Thus the database device also subscribes to the subscription identifier MK "/fieldDevice41/fieldData," which corresponds to the publication identifier MK under which the field device unit 41 publishes the measurement data $MD_1$ recorded by the sensor 411 as publication data $PD_1$. Thus the gateway device 2 transmits subscription data $Ap_1$, which comprise the measurement data $MD_1$ from the publication data $PD_1$, with the measurement data identifier MK as a subscription identifier to the database device 3. This stores the measurement data $MD_1$ in the measurement database 31.

The database device 3 then determines, using the temperature from the measured data $MD_1$, for example, a setpoint for the position of a flow control valve, not shown. The database device 3 then publishes control data SD, which comprise the setpoint, under a publication identifier SK of "{"/fieldDevice42/ controlData"}" as publication data $PD_2$. The publication identifier SK to be used is extracted by the database device 3 from the device data stored in the device database 32.

The field device unit 42 subscribes to subscription data with a subscription identifier SK of "{"/fieldDevice42/controlData"}", which corresponds to the publication identifier SK under which the measurement value database 31 publishes the publication data $PD_2$. Therefore, the gateway device 2 transmits subscription data $AD_2$, which comprise the control data SD from the publication data $PD_2$ with the control data identifier SK as a subscription identifier, to the field device unit 42. The field device unit 42 transfers the setpoint from the control data SD to the actuator 421, which moves the flow control valve into the specified position.

In some embodiments, the tablet computer 5 executes an app which is configured to operate the automation network 11 and, in particular, communicates with network devices in the automation network device 11 via the MQTT protocol. This means that the tablet computer 5 publishes management instructions via MQTT to the gateway 2 without needing to have knowledge of details of the network configuration of the database device 3 and/or the field device units 4, and subscribes to measurement data MD and control data SD, user data BD and/or device data GD, without the network devices 3, 4 that publish this data needing to have detailed knowledge of the network configuration of the tablet computer 5.

For example, the tablet computer 5 subscribes to subscription data $AD_1$ with the measurement data identifier MK as a subscription identifier. Therefore, the gateway 2 transmits the subscription data $AD_1$, which contain the measurement data $MD_1$ from the publication data $PD_1$ published by the field device unit 41 under the publication identifier MK, to the tablet computer 5 also. In this way, making exclusive use of the MQTT protocol, a real-time display of the temperature measurement data recorded by the sensor 411 is enabled on the display of the tablet computer 5.

In addition to the temperature measurement data $MD_2$, in the automation network 11, image data acquired by the image sensor 431 or a camera of the field device unit 43 are additionally published under the measurement data identifier MK as the publication identifier as publication data $PD_6$. However, in some implementations the MQTT protocol does not allow more than 4096 bytes of payload data. For this reason the field device unit 43 carries out an encoding of the image data, in order to prepare them for publication in accordance with the MQTT protocol. In particular, the image data are first compressed in accordance with the JPG algorithm and then split into individual image data segments of 4092 bytes. The remaining 4 bytes are used for a counter, which comprises a consecutive number of each image data segment.

Then the field device unit 43 publishes a sequence of payloads $MD_2$, each formed of one of the image data segments and a counter, as publication data $PD_6$ under the measurement data identifier MK. The tablet computer 5, which subscribes to subscription data with the subscription identifier MK, receives the individual payloads $MD_2$ transmitted from the gateway device 2 as subscription data $AD_6$, but not necessarily in the order in which they were published by the field device unit 43. The tablet computer 5 therefore collects the image data sections comprised in the individual payloads $MD_2$, arranges them in the order of the serial numbers contained in the payloads $MD_2$, and then decodes them according to the JPG algorithm to form viewable image data, and displays the reconstructed image on its display.

In addition to the functionality for "live" or real-time display, the tablet computer 5 is also used for the administration of the automation network 11. For this purpose, the tablet computer 5 also subscribes to subscription data $AD_3$ and $AD_4$ with the device data identifier GK or the user data identifier BK as a subscription identifier. Thus the gateway 2 transmits device data GD from the device database 32, which are contained in the publication data $PD_3$ published by the database device 3 under the publication identifier GK, and user data BD from the user database 33, which are contained in the publication data $PD_4$ published by the database device 3 under the publication identifier BK, to the tablet computer 5. In this way, making exclusive use of the MQTT protocol, a display of device data and user data concerning the devices and the users of the automation network 11 can be realized on the display of the tablet computer 5.

In some embodiments, the database device 3 does not publish the publication data $PD_3$ and $PD_4$ continuously, but only on request and only after authorization of each user of the tablet computer 5. In this variant, the tablet computer 5 first generates management instructions $VD_1$, which comprise a command such as "authorisationRequest", a username entered by an operator of the tablet computer 5 and a password entered by the operator of the tablet computer 5, and also a device data identifier GK randomly generated by the tablet computer 5 and a randomly generated user data identifier BK. The tablet computer 5 publishes these management instructions $VD_1$ as the payload of publication data $PD_5$ under a predetermined management identifier VK, such as "/managementRequests" on the gateway device 2.

The database device 3 subscribes to subscription data $AD_5$ with the predetermined management identifier VK, and thus the gateway transmits the management instructions $VD_1$ to the database device 3. The database device 3 checks whether an operator with the username contained in the management instructions $VD_1$ is registered in the user database 33, whether the password contained in the management instructions $VD_1$ is correct, and to which data in the databases 31, 32, 33 the user concerned has access. Upon successful verification the database device 3 publishes device data GD and user data BD as publication data $PD_3$ and $PD_4$ under the publication identifiers GK or BK randomly generated by the tablet computer 5. In this way, the operator of the tablet computer 5 only obtains access to the data accessible to them from the user data BD and device data GD from the device database 32 or the user database 33 respectively of the database device 3, if they have previously been correctly authenticated and authorized.

Figure 3:
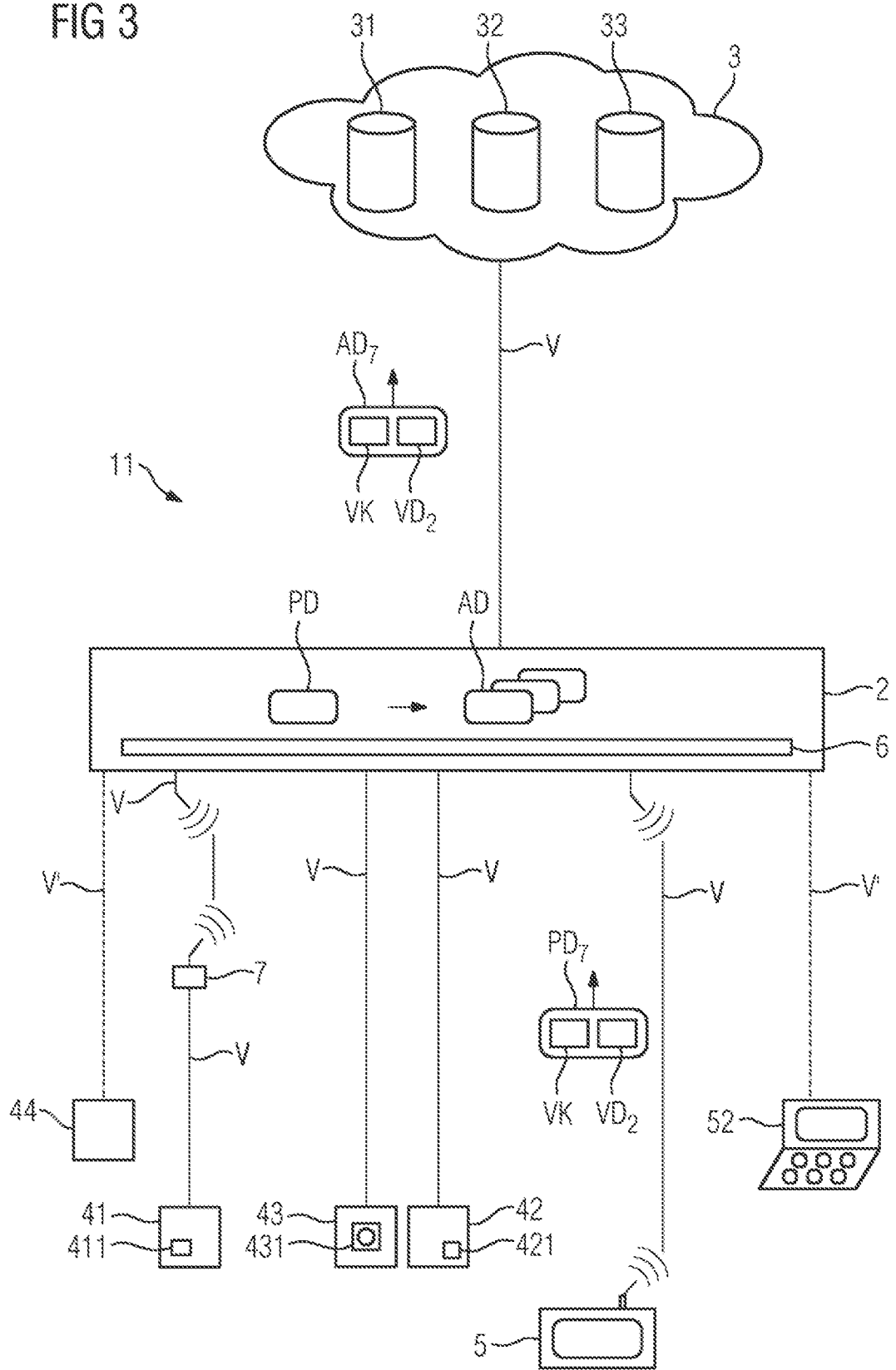
FIG. 3 shows the addition of further network devices to the automation network according to the second exemplary embodiment.

By reference to FIG. 3 the case will now be considered whereby a further field device unit 44 and a computer 52—an example of another operating device 5—are to be added to the automation network device 11. The field device unit 44 and the computer 52 must be made known to the database device 3. For example, it must be entered in the device database 32 of the database device 3 which subscription and publication identifiers the field device unit 44 uses to subscribe or publish data, so that an automation algorithm can take account of the field device 44. In addition, a username, password and authorization information must be deposited in the user database 33, with which a user of the computer 52 can authenticate and authorize themselves, as described above.

For this purpose, based on inputs from the operator of the tablet computer 5, the tablet computer 5 generates management instructions $VD_2$, which comprise a command such as "addDevice" and the data to be entered in the device database 32 of the database device 3 concerning the field device unit 44 and the computer 52, as well as a command such as "addUser" and the data to be entered in the user database 33 of the database device 3 concerning a user of the computer 52. The management instructions $VD_2$ may also, as described above, comprise a command such as "authorisationRequest" and a username and a password of an operator of the tablet computer 5, in order to authorize the commands included in the management instructions $VD_2$ against the database device 3. The tablet computer 5 publishes the management instructions $VD_2$ on the gateway device as publication data $PD_7$ with the predetermined management identifier VK as a publication identifier. As described above, the gateway device 2 transmits the subscription data $AD_7$, which in this case comprise the management instructions $VD_2$, with the subscription identifier VK to the database device 3.

In some embodiments, the database device 3 first authenticates and authorizes the username and password of the operator of the tablet computer 5 from the management instructions VD$_2$ transmitted. In other words, it checks by reading from the user database 33 whether a corresponding username and the same password have been entered, and whether rights have been granted to this username to issue the commands contained in the management instructions VD$_2$. Upon successful verification the commands "addUser" and "addDevice" contained in the management instructions VD$_2$ are executed. In this way, the device data in the device database 32 and the user data in the user database 33 are modified in such a way that the field device unit 44 and the computer 52 are registered in the device database 32 and the operator of the computer 52 is registered in the user database 33.

Subsequently, the connection paths V shown in dashed lines in FIG. 3 are created, for example by plugging in a cable or by connecting an appropriate device to a WLAN. The newly added field device unit 44 and the computer 52 can now subscribe to publication data PD published in the automation network 11 according to the MQTT protocol as subscription data AD and publish publication data PD itself, to which the database device 3 and other network devices 4, 5 can subscribe.

In this way, a management operation for the automation network device 11, namely the addition of a field device unit 44 and a control device 52, has been performed on the gateway device 2 exclusively by using the specified MQTT protocol.

The temperature, the image data and the setpoint for a position of a flow control valve are merely examples of measurement and setpoint data, and the automation system can use any other measurement and setpoint data. An arbitrarily large number of field device units 4 can also be provided. The authentication and authorization procedure described above is also a highly simplified example. In some embodiments, other authentication and authorization methods can be used, provided that the appropriate communications take place using the specified protocol.

For example, the gateway device 2 could itself comprise a further network device. In this variant, operating devices 5 are authenticated and authorized against the network device of the gateway device 2, wherein the specified MQTT protocol is also used. Upon successful authentication an encrypted VPN connection is set up between the respective operating device 5 and the gateway device 2. All other publications and subscriptions must be made exclusively via the encrypted VPN. Other techniques for ensuring security are possible, provided the corresponding data transfers, if necessary using prior preparation or encoding of the individual data packets, are carried out using the specified MQTT protocol.

It is also possible to provide more than one gateway device, in particular the plurality of gateway devices can be linked together in a hierarchical structure. In this way, the processing load is distributed, and publications and subscriptions can be restricted to individual segments of the automation network.

What is claimed is:

1. A method for operating an automation network comprising a gateway device and a plurality of network devices, the method comprising:
    subscribing at least one of the plurality of network devices to subscription data by means of a respectively associated subscription identifier;
    publishing publication data on the gateway device under a respectively associated publication identifier;
    publishing publication data with the gateway device as subscribed subscription data under a respective subscription identifier corresponding to the respective publication identifier of the publication data so each of the plurality of network devices subscribed to subscription data with the same subscription identifier as the respective publication identifier receive the subscribed subscription data transmitted with the subscription identifier;
    wherein the respective network devices each comprise: a field device unit subscribing to, collecting, and/or publishing measurement data and/or control data, and a database device subscribing to, storing, providing and/or publishing the measurement data and/or control data of the field device unit, device data about network devices present in the automation network, and user data about users of the network devices;
    wherein the transmission of data between the respective network devices takes place according to a single specified protocol, by subscribing and publishing via the gateway device.

2. The method as claimed in claim 1, wherein:
    the specified protocol comprises message-queue telemetry transport protocol/MQTT protocol;
    a respective subscription identifier and a relevant publication identifier are each an MQTT topic; and
    the gateway device implements an MQTT broker.

3. The method as claimed in claim 1, wherein:
    transmission during a respective subscription and/or publishing operation takes place via a particular TCP connection path; and
    the specified protocol is the MQTT protocol.

4. The method as claimed in claim 1, further comprising blocking data transfers between the respective network devices and/or requests to the gateway device which do not comply with the specified protocol.

5. The method as claimed in claim 1, wherein:
    the field device unit collects measurement data and publishes said data as publication data with a measurement data identifier as a publication identifier;
    as subscription data the database device subscribes to the measurement data with the measurement data identifier as a subscription identifier;
    the database device, in accordance with the subscribed measurement data and/or the device data stored in the database device, generates control data for the field device unit and publishes said control data as publication data with the control data identifier as publication identifier;
    as subscription data the field device unit subscribes to the control data with the control data identifier as a subscription identifier; and
    the field device unit performs an automation task in accordance with the subscribed control data.

6. The method as claimed in claim 1, wherein:
    the respective network devices further comprise an operating device displaying subscribed data and/or collecting and publishing management instructions; and
    management instructions comprise instructions of an operator causing the database device to modify data stored in the database device.

7. The method as claimed in claim 6, wherein the operating device comprises a tablet computer, a smartphone, a portable computer, or a static computer.

8. The method as claimed in claim 6, wherein:
the field device unit collects measurement data and publishes said data as publication data with a measurement data identifier as a publication identifier;
the operating device subscribes to the measurement data with the measurement data identifier as a subscription identifier as subscription data; and
the operating device displays the subscribed data.

9. The method as claimed in claim 6, wherein:
the database device publishes the device data with a device data identifier as a publication identifier and/or publishes the user data with a user data identifier as a publication identifier; and
the operating device subscribes to the device data with the device data identifier as a subscription identifier as subscription data and/or subscribes to the user data with the user data identifier as a subscription identifier as subscription data; and
the operating device displays the subscribed device data and/or the subscribed user data.

10. The method as claimed in claim 1, wherein data intended for publishing by a specific network device are encoded in publication data in a data format of the specified protocol and subscribed subscription data in the data format of the specified protocol are received by a respective subscribing network device.

11. The method as claimed in claim 10, wherein the encoding of the data intended for publishing into a data format of the specified protocol comprises splitting the data intended for publishing over a plurality of MQTT frames.

12. The method as claimed in claim 1, wherein:
the transmission during a respective subscription and/or publishing operation takes place via a respective UDP, ZigBee, or TinyOS connection path; and
the specified protocol comprises a MQTT-SN protocol.

13. An automation network comprising:
a gateway device; and
a plurality of network devices;
wherein each of the plurality of network devices are configured for subscribing to subscription data with a respective associated subscription identifier and for publishing publication data on the gateway device under a respective associated publication identifier;
wherein the gateway device is configured for publishing the publication data as subscribed subscription data under a respective subscription identifier corresponding to the respective publication identifier of the publication data, in such a way that to all network devices, which subscribe to subscription data with the same subscription identifier as the respective publication identifier, the subscribed subscription data are transmitted with the subscription identifier;
wherein the network devices comprise: a field device unit configured to subscribe to, collect and/or publish measurement data and/or control data, and a database device configured for subscribing to, storage, provision and/or publication of the measurement data and/or of control data of the field device unit, of device data about network devices present in the automation network, and of user data about users of the network devices;
wherein the respective network devices are each configured for transferring data to and from other network devices according to a single specified protocol, in particular exclusively by subscribing and publishing via the gateway device.

* * * * *